United States Patent [19]
Guidoux et al.

[11] 4,180,705
[45] Dec. 25, 1979

[54] ARRANGEMENT FOR THE AUTOMATIC RESYNCHRONIZATION OF A DATA TRANSMISSION RECEIVER

[75] Inventors: Loic B. Y. Guidoux; Jean-Louis Renaudat, both of Le'Plessis-Robinson, France

[73] Assignee: Telecommunications Radioelectriques et Telephoniques TRT, Paris, France

[21] Appl. No.: 838,633

[22] Filed: Oct. 3, 1977

[30] Foreign Application Priority Data
Oct. 6, 1976 [FR] France .................................. 76 30034

[51] Int. Cl.² .............................................. H03H 7/36
[52] U.S. Cl. .................................... 178/69.1; 325/323
[58] Field of Search ............................. 178/69.1, 69 R; 179/15 BS; 333/18; 325/41, 42, 43, 44, 321, 323, 325

[56] References Cited
U.S. PATENT DOCUMENTS 3,955,141  5/1976  Lyon et al. .......................... 178/69.1
4,061,978  12/1977 Motley et al. .......................... 333/18

Primary Examiner—Benedict V. Safourek
Attorney, Agent, or Firm—Thomas A. Briody; William J. Streeter; Edward W. Goodman

[57] ABSTRACT

A resynchronization arrangement for a data receiver having an auto-adaptive equalizer and a demodulator which utilizes a local carrier phaselocked on the received carrier by means of a control loop comprising an integrating circuit. Starting from a signal indicating a synchronization loss the arrangement generates three command pulses: a first pulse makes the adjustable coefficients of the equalizer and the signal in the memory of the integrating circuit equal to zero; a second pulse is used for making a reduced number of coefficients of the equalizer operative immediately after the first pulse and for reducing the time constant of the integrating circuit; a third pulse is used to make the synchronization loss indication signal equal to zero a given period of time after the end of the second pulse. Resynchronization is obtained without the necessity of a return connection to the transmitter.

1 Claim, 2 Drawing Figures

ARRANGEMENT FOR THE AUTOMATIC RESYNCHRONIZATION OF A DATA TRANSMISSION RECEIVER

The invention relates to an arrangement for the automatic resynchronization of a receiver in a system for data transmission by means of modulating a carrier, the receiver comprising an auto-adaptive equalizer using a predetermined number of adjustable filter coefficients during the transmission and a demodulator having a generator for a local carrier whose phase is locked on a received carrier by means of a control loop, in which a phase error signal is supplied to an integrating circuit having a predetermined time constant during the transmission, the receiver further comprising a derangement detector for supplying a derangement indication signal indicating a synchronization loss of the receiver.

If during the transmission of data between a transmitter and a receiver certain abnormal conditions occur, such as fugitive disturbances during which strong interference signals act on the transmitter, the transmission path or the receiver, this receiver may lose its synchronization, so that it arrives in an incorrect operating condition from which it cannot recover by itself after these abnormal circumstances have disappeared. An incident which may cause this synchronization loss is, for example, a brief interruption of the transmission line.

The sections of the considered receiver which are sensitive to this kind of incidents relate to the adjustment of the coefficients of the auto-adaptive equalizer and the stabilization of the local carrier which can both be permanently out of control after a fugitive incident.

A prior art technique for resynchronizing the receiver consists of the use of the procedure normally used at the start of the data transmission. To this end the synchronization loss must be detected in the receiver and an alarm signal must be sent to the remote transmitter to replace the data signal by the training sequence used for starting the data transmission. After resynchronization of the receiver the data transmission can be resumed again.

So this procedure requires a special return circuit from the modem comprising the receiver to the modem comprising the transmitter for transmitting information indicating a synchronization loss. So this procedure is suitable for modems interconnected by means of four-wire circuits but it has the drawback that it is difficult to use it in modems interconnected by means of two-wire circuits or in modems forming part of a multi-point network.

To mitigate this drawback, the invention has for its object to provide an arrangement which enables an automatic resynchronization of the receiver starting solely from the data signals such as they enter without the remote transmitter being forced to transmit a special training sequence.

The resynchronization arrangement according to the invention comprises means to form a first and a second command pulse occurring simultaneously with said derangement indication signal and having such a predetermined maximum duration that the duration of the second command pulse exceeds that of the first command pulse, said means also forming a brief third command pulse occurring a predetermined period of time after the end of the maximum duration of the second command pulse, the first command pulse being used to make the adjustable filter coefficient of the equalizer and the signal present in the memory of the integrating circuit equal to zero, the second command pulse being used to make a reduced number of adjustable filter coefficient of the equalizer operative after the end of the first command pulse and to reduce the time constant of the integrating circuit, the third command pulse being used to reset the derangement detector to its starting position.

An embodiment of the invention will now be further explained with reference to the accompanying drawings.

FIG. 1 shows the principal components of a data transmission receiver, which components are acted upon by the arrangement according to the invention for automatically resynchronizing this receiver in the case of a synchronization loss occurring during the transmission.

At its input 1 this receiver receives a carrier modulated by data signals in the remote transmitter (not shown). The considered receiver comprises an auto-adaptive equalizer and a demodulator for reproducing the data by means of a local reference carrier phase-locked on the received carrier. The invention can be applied to any type of modulation of the carrier (phase modulation, amplitude modulation or frequency modulation) and irrespective of the structure of the receiver, that is to say both in a receiver in which the equalizer, which is then called passband equalizer, precedes the demodulator and also in a receiver in which the demodulator precedes the equalizer, which is then called baseband equalizer.

Figure 1:
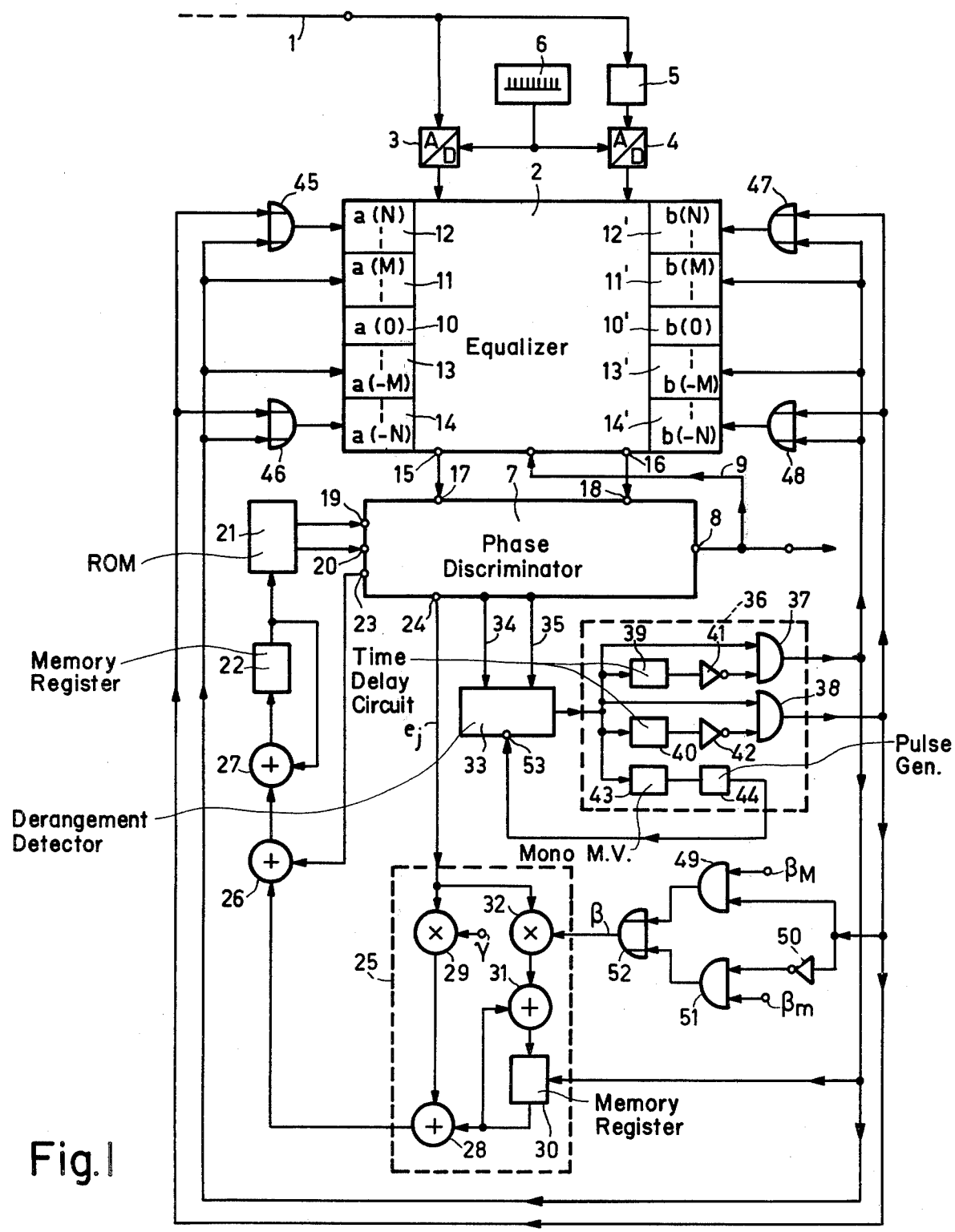
FIG. 1 shows the block diagram of the resynchronization arrangement according to the invention associated with a data transmission receiver.

By way of example it is assumed in FIG. 1 that the carrier applied to the input of the receiver is modulated in phase by the data signals and that this receiver has a structure composed of a passband equalizer followed by a demodulator. This passband equalizer is, for example, the equalizer which is described in U.S. Pat. No. 4,035,725, the demodulator using the phase discriminator which is described in French Patent Application No. 75 39 962 filed on Dec. 29, 1975 which corresponds to U.S. application No. 753,270, filed Dec. 22, 1976, now abandoned in favor of a continuation application.

Passband equalizer 2 is of the digital type and uses coded samples of the in-phase passband signal supplied by a sampling-and-coding circuit 3 and coded samples of the quadrature passband signal supplied by a sampling-and-coding circuit 4 receiving the passband signal shifted over 90° by a phase shifting circuit 5. In these sampling-and-coding circuits 3 and 4 the sampling frequency is supplied by a clock pulse generator 6 and by using a phase discriminator 7 of the type described in the above-mentioned French Application No. 75 39 962 after equalizer 2 it is possible to operate with a reduced sampling frequency equal to the modulation rate.

Passband equalizer 2 comprises two digital filters which respectively process the signal samples of the in-phase and quadrature components of the passband signal; the coefficients of these filters are called $a(k)$ and $b(k)$, respectively, where k is an integer between $-N$ and $+N$. Equalization is obtained by means of adjustment circuits for the coefficients $a(k)$ and $b(k)$, where $k \neq 0$, which adjust these coefficients in an iterative manner in accordance with the recursion formulas $$\begin{cases} a(k)^{n+1} = a(k)^n + \alpha \Delta a(k) \\ b(k)^{n+1} = b(k)^n + \alpha \Delta b(k) \end{cases} \quad (1)$$

These relations indicate that the coefficients a(k), b(k) are incremented at each iteration step by the values $\alpha \Delta a(k)$ and $\alpha \Delta b(k)$, where $\Delta a(k)$ and $\Delta b(k)$ are terms calculated at each iteration step n in the equalizer, and where $\alpha$ is a weighting factor smaller than or equal to 1 whose value in particular determines the rate at which equalization is achieved. In particular, the terms $\Delta a(k)$ and $\Delta b(k)$ are calculated utilizing the phase jumps corresponding to the transmitted data signals such as these phase jumps are reproduced at an output 8 of phase discriminator 7, which is indicated in FIG. 1 by a connection 9 between output 8 and equalizer 2.

For a proper understanding of the present invention it is sufficient to represent in equalizer 2 the memories containing the coefficients a(k) and b(k). To facilitate the remaining portion of the description the memories containing the coefficients a(k) are grouped in the following manner: a memory 10 contains the central coefficient a(0); memories 11 and 12 contain the coefficients a(1)—a (M) and the coefficients a(M+1)—a(N), respectively, where M is greater than 1 and smaller than N; memories 13 and 14 contain the coefficients a(−1)—a(−M) and the coefficients a(M−1)—a(−N), respectively. The coefficients b(k) are grouped in the same manner in memories bearing the same reference numerals, but now provided with a dash. The memories 10 and 10' contain the coefficients a(o) and b(o) which are fixed and equal to 1 and 0, respectively. The memories 11–14 and 11'–14' containing the adjustable coefficients are provided with clearing inputs which are indicated by leads, provided with arrows, which leads carry the command signals supplied by the resynchronization arrangement in the case of synchronization loss and to be described in greater detail hereinafter. Not a single signal arrives on these clearing inputs during the normal functioning of the receiver and all coefficients in the memories 11–14 and 11'–14' of equalizer 2 are then automatically adjusted in the manner described above with the aid of a weighting factor $\alpha$ fixed at a given low value.

The in-phase and quadrature components of the equalized passband signal obtained at the two outputs 15 and 16 of equalizer 2 are supplied to the two inputs 17 and 18 of digital phase discriminator 7, which further receives at its inputs 19 and 20 the in-phase and quadrature components, originating from a ROM-memory 21, of a local reference carrier phaselocked on the received carrier.

The phase of the local carrier is generated at the output of a memory register 22. Phase discriminator 7 comprising a phase control loop circuit for the local carrier is, for example, of the type described in the above-mentioned French Patent Application No. 75 39 962. At each of the sampling instants jT, phase discriminator 7 supplies at its output 8 the phase jump $SP_j$ between the instants (j−1)T and jT which corresponds to the transmitted data signals. At its output 23, phase discriminator 7 supplies the phase variation $\Delta \phi_j$ of the transmitted modulated carrier between the instants (j−1)T and jT, this phase variation being nothing else but the phase jump $SP_j$ increased by the constant phase variation of the transmitted non-modulated carrier. At its output 24, phase discriminator 7 supplies the phase error $e_j$ which is the difference between the phase variation $\Delta \phi_j$ of the received carrier between the instant (j−1)T and jT and the phase variation $\Delta \phi_j'$ of the transmitted carrier between these instants. This phase error $e_j$ is the result of noise and frequency and/or phase offset produced by the transmission path.

The phase of the local reference carrier is stabilized on the phase of the received carrier by calculating the local carrier phase $\phi_j'$ at each sampling instant jT in accordance with the expression:

$$\phi_j' = \phi_{j-1}' + \Delta \phi_j' + \delta \phi \quad (2)$$

where $\phi_{j-1}'$ is the phase of the local carrier at the preceding sampling instant (j−1)T, $\Delta \phi_j'$ is defined above and $\delta \phi$ is a phase correction term calculated on the basis of the phase errors $e_j$.

A circuit 25 for calculating the phase correction is connected to said output 24 and supplies this term $\delta \phi$. An adder 26 supplies the sum $\Delta \phi_j' + \delta \phi$ which is applied to an adder 27 simultaneously with the phase $\phi_{j-1}'$ stored in memory register 22 so that at each sampling instant jT this adder 27 supplies the phase $\phi_j'$ in accordance with the expression (2).

Circuit 25 calculates the phase correction $\delta \phi$ as the sum of two terms $\delta \phi_1$ and $\delta \phi_2$, this sum being obtained by means of an adder 28. The term $\delta \phi_1$ is proportional to the phase error $e_j$ and is obtained by means of a multiplier 29 which forms the product $\gamma e_j$, $\gamma$ being a weighting factor smaller than or equal to 1. The term $\delta \phi_2$ is proportional to the integral of the phase error $e_j$ and is obtained by means of an integrating circuit formed by a memory register 30 connected between the outputs and one input of an adder 31, the other input of which is connected to the output of a multiplier 32. This multiplier 32 forms the product $\beta e_j$, $\beta$ being a weighting factor smaller than or equal to 1. Register 30 constitutes the memory of the integrating circuit and the value of the coefficient $\beta$ determines the time constant of this integrating circuit. After the local carrier has been stabilized the coefficient $\beta$ is fixed at a low value during the data transmission.

It may happen that incidents such as a temporary line interruption effect a synchronization loss of the receiver consisting of a permanent maladjustment of the filter coefficients of the equalizer and of the phase of the local carrier, which maladjustment cannot be compensated by the corresponding control mechanisms. The result is an unpermissible number of errors in the data signals reproduced in the form of phase jumps at output 8 of phase discriminator 7. This synchronization loss is detected by a derangement detector 33 which, in the described receiver, can be implemented in a manner as described in French Patent Application No. 76 29 359 filed on Sept. 30, 1976 which corresponds to U.S. application No. 834,957, filed Sept. 20, 1977. Starting from the signals $x_3$, $x_3$ which are described in last-mentioned application and which are supplied by phase discriminator 7 at its output leads 34 and 35, derangement detector 33 supplies a logic signal indicating a synchronization loss of the receiver.

Starting from this logic signal the present invention enables an automatic restoration of the synchronization of the receiver without it being necessary, as in the prior art arrangement, to transmit some kind of command to the remote transmitter, so that this transmitter can continue the transmission of the data signals.

Figure 2:
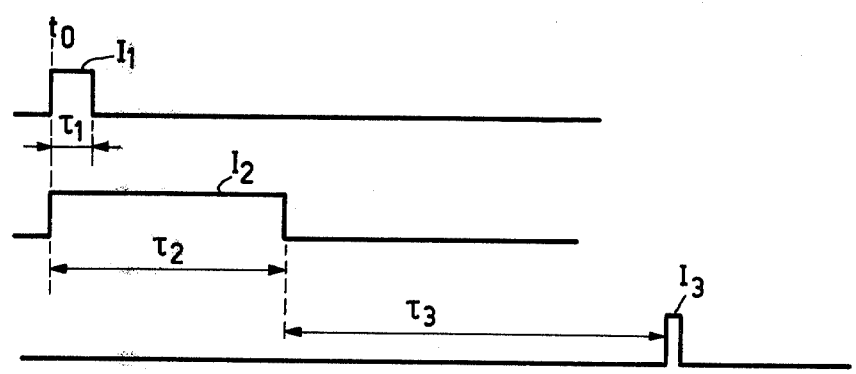
FIG. 2 shows time diagrams of the command pulses used in the arrangement according to the invention.

The resynchronization arrangement according to the invention comprises a circuit 36 for forming—from the instant $t_o$ at which the derangement indication signal appears—three command pulses $I_1$, $I_2$, $I_3$ which are shown in the time diagrams of FIG. 2. The first and second command pulses $I_1$ and $I_2$ occur simultaneously with the derangement indication signal and are of such a maximum duration $\tau_1$ and $\tau_2$ that the maximum duration $\tau_2$ of the second command pulse exceeds the maximum duration $\tau_1$ of the first command pulse. The third command pulse $I_3$ is a short pulse which occurs a certain time interval $\tau_3$ after the end of the second command pulse $I_2$. As shown in FIG. 1, the pulses $I_1$ and $I_2$ are formed at the output of two AND gates 37 and 38 which receive the derangement indication signal at one input and, at the other input, the derangement indication signal delayed by two circuits 39 and 40 producing delays $\tau_1$ and $\tau_2$, respectively, and thereafter inverted by two inverters 41, 42. The third control pulse $I_3$ is formed by means of a monostable circuit 43 which is triggered by the derangement indication signal and which produces a pulse having a fixed duration $\tau_2 + \tau_3$, the trailing edge of the latter pulse being detected by a circuit 44 which supplies a pulse of a short duration.

The first control pulse $I_1$ is applied on the one hand to the clearing inputs of the memories 11, 13 and 11', 13' and on the other hand through OR-gates 45, 46 and 47, 48 to the clearing inputs of the memories 12, 14 and 12',14' for making the adjustable filter coefficients of equalizer 2 equal to zero. In addition, this pulse $I_1$ is applied to a clearing input of memory register 30 of phase correction calculating circuit 25 to make the signal present in this register 30 equal to zero.

Through said OR-gates 45, 46 and 47, 48 the second command pulse $I_2$ is applied to the clearing inputs of the memories 12, 14 and 12', 14' so that, from the end of the first command pulse $I_1$ to the end of the second command pulse $I_2$, the adjustable filter coefficients in these memories are maintained at the value zero, whereas the adjustable filter coefficients in the memories 11, 13 and 11', 13' are adjusted by the adjustment circuits for the coefficients of equalizer 2.

In addition, the second command pulse $I_2$ is applied to an input of an AND-gate 49 and to an inverter 50, whose output is connected to an input of an AND-gate 51. The output of these AND-gates 49 and 51 is connected to an OR-gate 52 whose output is connected to the input of multiplier 32 which serves for receiving the weighting factor $\beta$ fixing the time constant of integrating circuit 30, 31. In the absence of the second control pulse $I_2$, this coefficient $\beta$ has the low value $\beta_m$ which is applied to the other input of AND-gate 51, and in the presence of this second command pulse $I_2$, the coefficient $\beta$ has the high value $\beta_M$ which is applied to the other input of AND gate 49, it invariably holding that: $0 < \beta_m < \beta_M \leq 1$. The third command pulse $I_3$ obtained at the output of circuit 44 is applied to a reset input 53 of derangement detector 33.

The description of the operation of this resynchronization arrangement will now be given, starting from the instant $t_o$ at which a derangement indication signal appears, nothing being changed in the data signal supplied by the remote transmitter. The duration $\tau_1$ of the first command pulse $I_1$ corresponds to an initiation phase during which the equalizer 2 is adjusted to its rest position (all adjustable filter coefficients have been made equal to zero) and during which memory register 30 is emptied. The duration $\tau_1$ can be very brief, of the order of magnitude of a period corresponding to the modulation rate.

From the end of the first command pulse $I_1$ the actual resynchronization phase begins. During the second command pulse $I_2$ equalizer 2 operates with a reduced number of adjustable filter coefficients (2M coefficients $a(k)$ in the memories 11 and 13 and 2M coefficients $b(k)$ in the memories 11' and 13') and with an unchanged coefficient $\alpha$, that is to say this coefficient is kept at the low value corresponding to a normal transmission condition. In these circumstances equalizer 2 can supply an approximated equalization, the acquisition time of this equalization being comparatively long. At the same time integrating circuit 30, 31 in phae correction calculation circuit 25 operates with a small time constant which corresponds to the high value $\beta_M$ of the weighting factor $\beta$. In these circumstances the acquisition time of the phase of the local carrier is comparatively short, even in the presence of considerable frequency offset in the transmission path.

The derangement indication signal may disappear before the end of the maximum duration $\tau_2$ of the second command pulse $I_2$, $\tau_2$ being equal to, for example, 1.5 sec. Immediately after the disappearance of the second command pulse $I_2$ equalizer 2 operates with all its adjustable filter coefficients (2N coefficients $a(k)$ in the memories 11–14 and 2N coefficients $b(k)$ in the memories 11'–14') and integrating circuit 30, 31 operates with a large time constant which corresponds to the low value $\beta_m$ of the weighting factor $\beta$. The receiver can then stop resynchronizing because all the elements thereof are in the normal transmission condition.

If owing to a transmission path that is difficult to be corrected, the derangement indication signal has not disappeared before the end of the maximum duration $\tau_2$ of the second command pulse $I_2$, all adjustable filter coefficients of the equalizer are made operative in the same manner after the second command pulse $I_2$ has disappeared and the coefficient $\beta$ is reduced to the low value $\beta_m$. The equalizer operating with all its adjustable coefficients can equalize the transmission path reasonably well and can thus effect the disappearance of the derangement indication signal which indicates the resynchronization of the receiver.

At the instant at which the third command pulse $I_3$ appears, for example $\tau_3 = 4$ sec. after the end of the maximum duration $\tau_2$ of the pulse $I_2$, the receiver cannot be resynchronized. If in this case a derangement indication signal should still be present, then the derangement indication signal, which disappears during the brief pulse $I_3$, again appears after the end of the pulse $I_3$ and the resynchronization procedure starts anew.

The resynchronization arrangement just described can be used in any receiver having an auto-adaptive equalizer and a circuit for recovering a local carrier whose phase is stabilized on the received carrier by means of a phaselocked loop. Irrespective of the type of equalizer—passband equalizer or baseband equalizer—it is always possible to make the value of the adjustable coefficients equal to zero, to make thereafter a portion of and, finally, all the coefficients operative. Furthermore, a phaselocked loop comprises of necessity an integrating circuit following the phase comparator (which in the example of FIG. 1 is included in phase discriminator 7), which integrating circuit receives the phase error signal originating from the comparator and whose output contributes towards controlling the phase or the frequency of the local carrier. It is always possible to make the signal in the memory of the integrating circuit equal to zero and to control the time constant of the integrating circuit.

What is claimed is:

1. An arrangement for the automatic resynchronization of a receiver in a system for data transmission by means of modulating a carrier, the receiver comprising an auto-adaptive equalizer using a predetermined number of adjustable filter coefficients during the transmission, a phase discriminator coupled to said equalizer and having a means for generating a local carrier, a control loop means for locking the local carrier phase on a received carrier, an integrating circuit having a predetermined time constant during the transmission, a memory, and an input means coupled to said discriminator for receiving a phase error signal, a derangement detector having an input coupled to said discriminator and an output means for supplying a derangement indication signal indicating a synchronization loss of the receiver, means coupled to said detector for forming a first and a second command pulse occurring simultaneously with said derangement indication signal and having such a predetermined maximum duration that the duration of the second command pulse exceeds that of the first command pulse and for also forming a brief third command pulse which occurs a predetermined time after the end of the maximum duration of the second command pulse, means for using the first command pulse to make the adjustable filter coefficients of the equalizer and a signal present in the memory of the integrating circuit equal to zero, means for using the second command pulse to make a reduced number of adjustable filter coefficients of the equalizer operative after the end of the first command pulse and to reduce the time constant of the integrating circuit, and means for using the third command pulse to reset the derangement detector.

* * * * *